US012623376B2

(12) United States Patent (10) Patent No.: US 12,623,376 B2

Courtney (45) Date of Patent: May 12, 2026

(54) MEMBRANE AND METHOD FOR MOLDING

(71) Applicant: Siemens Healthcare Limited, Camberley (GB)

(72) Inventor: Alistair Courtney, Oxford (GB)

(73) Assignee: Siemens Healthcare Limited, Camberley (GB)

( * ) Notice: Subject to any disclaimer, the term of this patent is extended or adjusted under 35 U.S.C. 154(b) by 25 days.

(21) Appl. No.: 18/241,279

(22) Filed: Sep. 1, 2023

(65) Prior Publication Data

US 2024/0083075 A1 Mar. 14, 2024

(30) Foreign Application Priority Data

Sep. 8, 2022 (EP) ..................................... 22275124

(51) Int. Cl.
  *B29C 33/30* (2006.01)
  *B29C 33/00* (2006.01)
(52) U.S. Cl.
  CPC ........ *B29C 33/308* (2013.01); *B29C 33/0038* (2013.01)
(58) Field of Classification Search
  CPC .... B29C 33/308; B29C 33/0038; B29C 33/50
  (Continued)

(56) References Cited

U.S. PATENT DOCUMENTS

| | | | | | |
|---|---|---|---|---|---|
| 3,947,209 | A | * | 3/1976 | Fox | C11C 5/023 |
| | | | | | 425/803 |
| 6,022,209 | A | * | 2/2000 | Kuo | B29C 33/44 |
| | | | | | 425/DIG. 32 |

(Continued)

FOREIGN PATENT DOCUMENTS

| | | |
|---|---|---|
| EP | 1198332 A1 | 4/2002 |
| EP | 2444241 A1 | 4/2012 |

(Continued)

OTHER PUBLICATIONS

Yasuda, S., et al.,"English machine-translation by Clarivate Analytics of JP2001061262, with Full EP patent application is included", Aug. 23, 1999. (Year: 1999).*

(Continued)

*Primary Examiner* — Abbas Rashid
*Assistant Examiner* — Gregory C. Grosso
(74) *Attorney, Agent, or Firm* — Banner & Witcoff, Ltd.

(57) ABSTRACT

A reusable mold membrane is provided for forming an outer mold during a process to encapsulate a target object in a substance, the mold membrane comprising: a cylindrical membrane body comprising a resiliently deformable material, wherein an inner diameter of the cylindrical membrane body is less than an outer diameter of the target object provided on an outer surface of a cylindrical carrier object, when the membrane body is in an un-deformed state; and a plurality of manipulation structures provided on an outer part of the membrane body, each of the plurality of manipulation structures configured to be manipulated by application of mechanical force to control the space within the membrane body by controlling the amount of deformation of the membrane body. There is also disclosed a method for use during a process to encapsulate a target object in a substance.

17 Claims, 10 Drawing Sheets

(58) Field of Classification Search
USPC .......................................................... 264/511
See application file for complete search history.

(56) References Cited

U.S. PATENT DOCUMENTS

| | | | |
|---|---|---|---|
| 6,491,855 B1 | 12/2002 | Harper | |
| 7,638,081 B2 * | 12/2009 | Clarke | B29C 45/14065 264/278 |
| 2002/0086081 A1 * | 7/2002 | Kuo | B29C 33/405 425/DIG. 44 |
| 2009/0267436 A1 | 10/2009 | Stiesdal | |
| 2017/0341319 A1 | 11/2017 | Harper | |

FOREIGN PATENT DOCUMENTS

| | | | |
|---|---|---|---|
| GB | 562012 A | 6/1944 |
| GB | 781925 A | 8/1957 |
| GB | 2284173 A | 5/1995 |
| GB | 2292332 A | 2/1996 |
| GB | 2319205 A | 5/1998 |
| GB | 2432336 A | 5/2007 |
| GB | 2553613 A | 3/2018 |
| JP | H01278317 A | 11/1989 |
| JP | 2001061262 A | 3/2001 |
| WO | 0102146 A1 | 1/2001 |
| WO | 2013132211 A1 | 9/2013 |

OTHER PUBLICATIONS

Yasuda, S., et al.,"English machine-translation by Clarivate Analytics of JP2001061262, with Full EP patent application is included", Aug. 23, 1999. (See NPL Document Filed on Feb. 11, 2025). (Year: 1999).*

Harper A. "Sound Composites Ltd. Case Study", Aug. 27, 2021, https://alanharpercomposites.com/blog/2021/08/27/uk-manufacturer-case-study/.

* cited by examiner

FIG 14

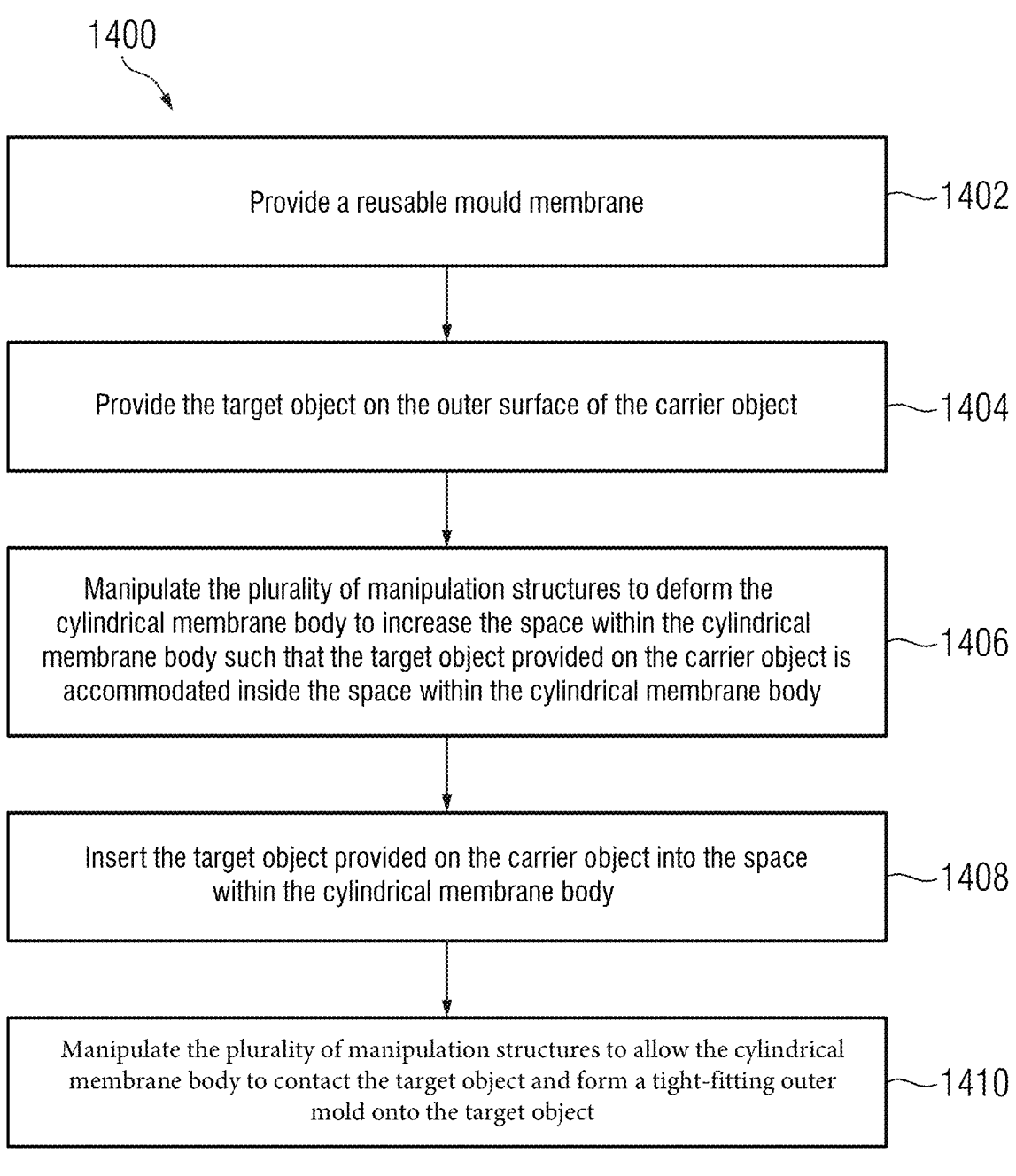

1400

Provide a reusable mould membrane —1402

Provide the target object on the outer surface of the carrier object —1404

Manipulate the plurality of manipulation structures to deform the cylindrical membrane body to increase the space within the cylindrical membrane body such that the target object provided on the carrier object is accommodated inside the space within the cylindrical membrane body —1406

Insert the target object provided on the carrier object into the space within the cylindrical membrane body —1408

Manipulate the plurality of manipulation structures to allow the cylindrical membrane body to contact the target object and form a tight-fitting outer mold onto the target object —1410

100

100

MEMBRANE AND METHOD FOR MOLDING

CROSS-REFERENCE TO RELATED APPLICATIONS

The present application claims priority to and the benefit of Europe patent application no. EP 22275124.0, filed on Sep. 8, 2022, the contents of which are incorporated herein by reference in their entirety.

TECHNICAL FIELD

The present application relates to a membrane for use in molding and a method for use during a process to encapsulate a target object.

BACKGROUND

Various techniques may be used to mold an object. In some examples, hard mold tools may be used. For example, a mold tool defining an internal space which provides the desired shape for the object to be molded may be used. In some examples, molding techniques may be used in order to coat or encapsulate a target object in a substance, such as a resin, for example. For these applications, it may be desired that the mold tool forms a tight fit around the target object.

In some examples, a part of the mold tool may be made of a flexible material to achieve a tight fit. For example, the target object may be provided on a rigid surface. The rigid surface may provide a platform for the molding process. A flexible material may then be deployed to fit tightly onto and match the shape of the target object. However, a tight fit matching the shape of the target object may be difficult to achieve and/or deploying the flexible material may be labor intensive, require large amounts of time, and/or may have to be done manually. The flexible material may be difficult to extract without affecting the substance encapsulating the target object. Typically, the flexible material is discarded after the process to encapsulate.

An object of the present application is to provide convenient and efficient structures and methods for molding to encapsulate a target object in a substance.

SUMMARY

According to a first aspect of the present disclosure, there is provided reusable mold membrane for forming an outer mold during a process to encapsulate a target object in a substance, the mold membrane comprising: a cylindrical membrane body comprising a resiliently deformable material, wherein an inner diameter of the cylindrical membrane body is less than an outer diameter of the target object provided on an outer surface of a cylindrical carrier object, when the membrane body is in an un-deformed state; and a plurality of manipulation structures provided on an outer part of the membrane body, each of the plurality of manipulation structures configured to be manipulated by application of mechanical force to control the space within the membrane body by controlling the amount of deformation of the membrane body.

Optionally, one or more of the plurality of manipulation structures comprises an elongate through hole; and the elongate through hole is configured to receive an elongate manipulation member such that applying a force to an end of the elongate manipulation member, in a direction perpendicular to the central longitudinal axis, causes the membrane body in the vicinity of the respective manipulation structure to deform.

Optionally, one or more of the plurality of manipulation structures comprises: an embedded manipulation member that is embedded within the membrane body; one or more attachment structures attached to the embedded manipulation member which protrude from the membrane body in a direction away from a central longitudinal axis of the membrane body.

Optionally, each of the one or more of the plurality of manipulation structures comprising the embedded manipulation member is configured such that applying a force to the one or more attachment features of the respective embedded manipulation member, in a direction perpendicular to the central longitudinal axis, causes the membrane body in the vicinity of the respective manipulation structure to deform.

Optionally, the mold membrane comprises a first seal arrangement provided towards a first end of the mold membrane, the first seal arrangement configured to form a seal against the carrier object positioned within the membrane body.

Optionally, the mold membrane comprises a second seal arrangement provided towards a second end of the mold membrane, the second seal structure configured to form a seal against the carrier object positioned within the membrane body.

Optionally, the membrane body comprises a flange towards the first end, wherein the flange extends inwards into the membrane body; and the first seal arrangement is provided on the flange.

Optionally, the mold membrane comprises a rigid base structure connected to the flange towards an innermost edge of the flange.

Optionally, the mold membrane comprises a first alignment arrangement configured to engage with a second alignment arrangement such that the rotational alignment of the mold membrane about the central longitudinal axis relative to the carrier object is fixed.

Optionally, the mold membrane comprises a reservoir structure provided towards a second end of the mold membrane for introducing the substance for encapsulation.

Optionally, each of the plurality of manipulation structures comprises manipulation structure fabric reinforcement molded into the respective manipulation structure.

Optionally, the membrane body comprises membrane body fabric reinforcement to restrict the amount of deformation of the membrane body.

According to a second aspect of the present disclosure, there is provided a method for use during a process to encapsulate a target object in a substance, the method comprising: using a reusable mold membrane to form the outer mold. The reusable mold membrane comprises: a cylindrical membrane body comprising a resiliently deformable material, wherein the inner diameter of the cylindrical membrane body is less than the outer diameter of the target object provided on an outer surface of a cylindrical carrier object, when the membrane body is in an un-deformed state; and a plurality of manipulation structures provided on an outer part of the membrane body, each of the plurality of manipulation structures configured to be manipulated by application of mechanical force to control the space within the membrane body by controlling the amount of deformation of the membrane body. The method comprises: providing the target object on the outer surface of the carrier object; manipulating the plurality of manipulation structures to deform the cylindrical membrane body to increase the space within the cylindrical membrane body such that the target object provided on the carrier object is accommodated inside the space within the cylindrical membrane body; inserting the target object provided on the carrier object into the space within the cylindrical membrane body; manipulating the plurality of manipulation structures to allow the membrane body to contract onto the target object such that a tight-fitting outer mold is formed on the target object.

Optionally, the method according to the second aspect comprises manipulating a given manipulation structure of the plurality of manipulation structures to adjust the outer mold on the target object in the vicinity of the given manipulation structure.

Optionally, the method according to the second aspect comprises introducing the substance between the outer mold formed by the mold membrane and an inner mold formed by the carrier object; and applying a vacuum to seal the mold membrane to the carrier object such that the target object is sealed between the mold membrane and the carrier object.

BRIEF DESCRIPTION OF THE DRAWINGS

Examples relating to the present disclosure will now be described with reference to the accompanying drawings, in which:

FIG. 14 is a flow diagram illustrating an example method for use during a process to encapsulate a target object;

DETAILED DESCRIPTION OF THE DISCLOSURE

Figure 1:
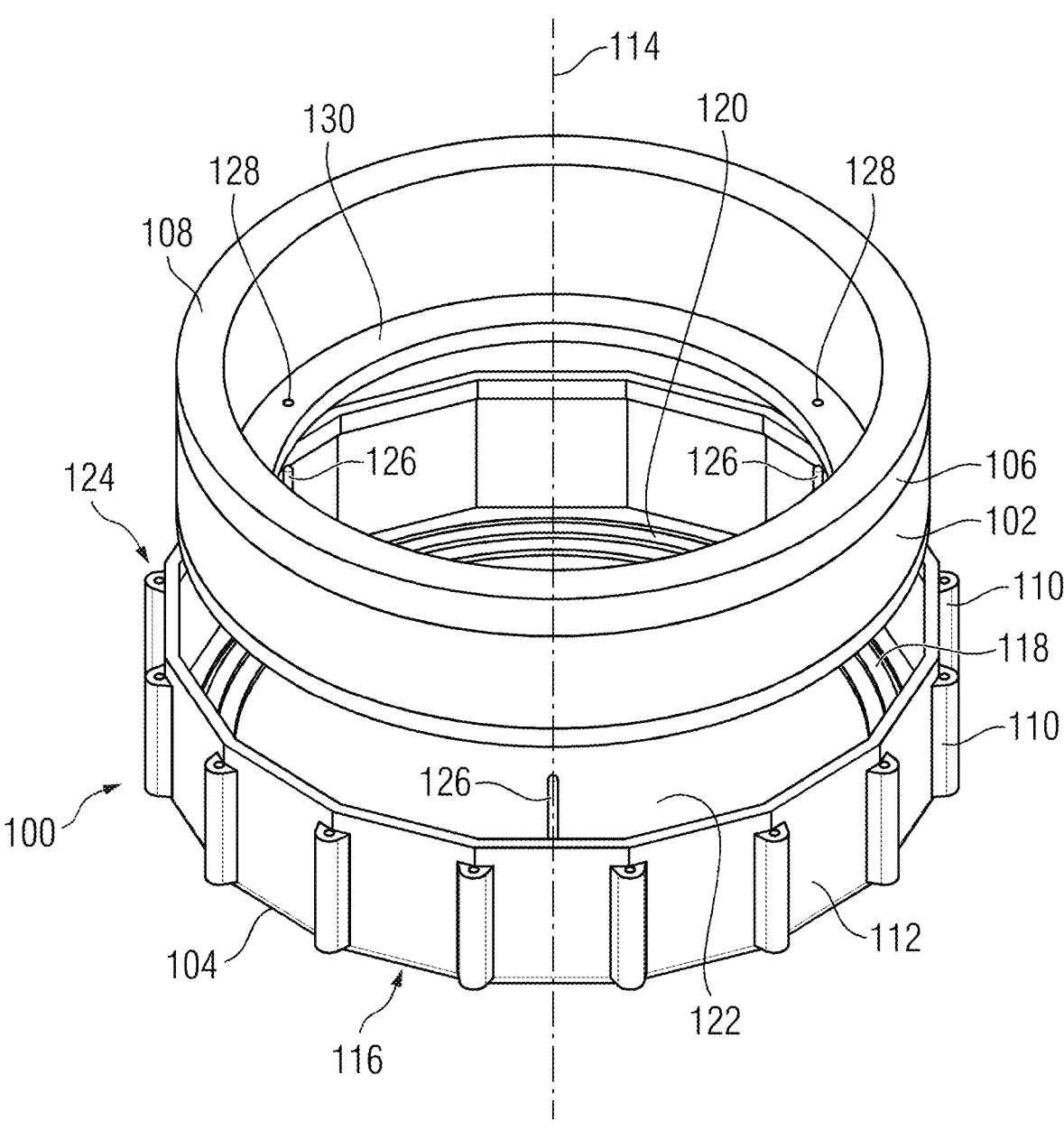
FIG. 1 is a first schematic perspective view of an example reusable mold membrane, according to one or more embodiments of the present disclosure.

The present application relates to a reusable mold membrane. The reusable mold membrane is, for example, reusable such that it may be deployed for multiple instances of a molding process for which the reusable mold membrane is intended.

Referring to the accompanying Figures, in embodiments, there is provided a reusable mold membrane 100 for forming an outer mold during a process to encapsulate a target object 102 in a substance. The mold membrane 100 comprises a cylindrical membrane body 104. The cylindrical membrane body 104 (hereafter often referred to as the membrane body, for brevity) comprises a resiliently deformable material, wherein the inner diameter 202 of the cylindrical membrane body 104 is less than the outer diameter 302 of the target object provided on an outer surface 106 of a cylindrical carrier object 108, when the membrane body 104 is in an un-deformed state. In embodiments, the mold membrane also comprises a plurality of manipulation structures 110, 910 provided on an outer part 112 of the membrane body 104, each of the plurality of manipulation structures 110, 910 configured to be manipulated by application of mechanical force to control the space within the membrane body 104 by controlling the amount of deformation of the membrane body 104.

FIGS. 1 to 13 and 15 to 17 illustrate example embodiments of the mold membrane 100 with various different examples of features shown. However, the mold membrane 100 includes examples which provide the above-described features and is not limited only to the specific examples shown in the Figures and discussed herein. Those skilled in the art will appreciate the various other ways in which the above-described features may specifically be deployed. It should be noted that for simplicity of illustrations, not all features may be shown and/or labeled in each of the Figures. Instead, the Figures are of a simplified schematic nature, and certain Figures may be used to illustrate specific examples of features.

FIG. 1 is a schematic perspective view showing an example reusable mold membrane 100, according to various embodiments. In these embodiments, the reusable mold membrane 100 is for forming an outer mold during a process to encapsulate a target object 102. In these examples, the target object 102 is provided on an outer surface 106 of a cylindrical carrier object 108. For example, the cylindrical carrier object 108 acts as an inner mold during the encapsulation process. In embodiments, the encapsulation process is, for example, a molding process in which the substance is molded between the inner and outer molds, and on the surfaces of the target object 102 to encapsulate the target object 102. For example, the encapsulation process may comprise fitting of the outer mold onto the target object 102, introducing the substance to coat the target object 102 and curing processes to cure the substance onto the target object 102, for example.

The outer surface 106 of the carrier object 108 is, for example, the outward facing surface of the cylinder defined by the cylindrical carrier object 108. In other words, the outer surface 106 is a surface of the carrier object 108 that faces in a direction away from a central longitudinal axis of the cylindrical carrier object 108. It should be noted that when the carrier object is inserted into the mold membrane, the central longitudinal axes of the carrier object and the mold membrane are more or less aligned. Therefore, reference may be made herein in relation to position and direction of elements of the carrier object with respect to the central longitudinal axis 114 of the mold membrane.

The target object may be any kind of object that can be placed on the cylindrical carrier object 108 for encapsulation via a molding process. In some embodiments, the target object is a coil for use as a magnet and is wrapped around the cylindrical carrier object 108. In some examples, the target object is a coil for the rotor windings of a motor or a generator.

The substance in which the target object 102 is to be encapsulated may be resin such as for example a thermoset resin such as polyester, polyurethane, vinyl ester, or epoxy. For example, it may be desired to encapsulate a coil for use as a magnet in a resin, depending on the application. In some embodiments, the coil being encapsulated may be large, for example, of a size appropriate for use in magnetic resonance imaging (MRI). In other examples, the reusable mold membrane 100 may be used as an outer mold in relation to other target objects. For example, embodiments of the mold membrane disclosed herein may be used in relation to any target object which may be provided on a cylindrical carrier object and where a tight-fitting outer mold is desired.

It may be desired to provide a coating of the substance on the target object with relatively consistent thickness while avoiding substance-rich areas. In the embodiments involving resin encapsulating a coil, it may be desired that the coating of resin on such a coil is consistent, and resin-rich areas are avoided. For example, resin-rich areas may be areas where more resin is present than on other areas of the surfaces of the target object 102. For example, it may be desired that the coating from the encapsulation process has a relatively consistent thickness on all surfaces of the target object 102 (within acceptable/realistic tolerances). For example, when the coil is energized to provide a magnetic field, resin rich areas may crack and/or may take energy away from the coil. This may be undesirable and impact on the application for which the coil is being used. Also, for example providing a relatively consistent thickness of coating while avoiding substance rich areas may reduce consumption of the substance. The consumption reduction may be large depending on the application. Also, for example, avoiding substance-rich areas may eliminate the need to remove excess substance from the encapsulated target object after curing and correspondingly reduce time taken for completing the encapsulation process.

In order to achieve a consistent coating of the substance (e.g., the resin) on the target object 102 (e.g., the coil) while avoiding substance-rich areas, it may be desired that the mold being used is tightly fitted onto the target object. The described embodiments advantageously provide for a tight-fitting outer mold.

The term "cylindrical" is used herein. In terms of cross section, the elements described as cylindrical may have a circular cross section. However, the cross section is not so limited. In some embodiments, the cross section may be an ellipse. For examples, the cross section taken perpendicular to the central longitudinal axis of the cylinder being described may be an ellipse. As referred to herein, a cylinder with a circular cross section is taken as a special case of a general cylinder which is not limited to a circular cross section.

Figure 2:
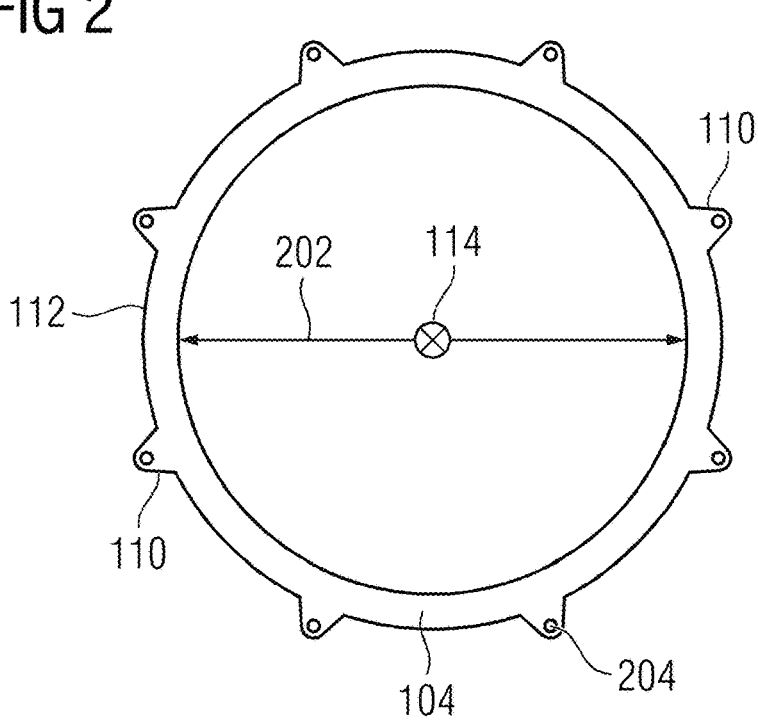
FIG. 2 is a schematic plan view of the example reusable mold membrane in a first state, according to one or more embodiments of the present disclosure.

In some embodiments, the membrane body 104 is an open cylinder. In some embodiments, the membrane body 104 comprises one or more flanges, as described further below. In the described embodiments, the membrane body 104 comprises a resiliently deformable material. For example, the membrane body 104 may comprise an elastomer such as silicone, and the like. In some examples, the membrane body 104 may comprise latex, a nitrile rubber, polyurethane or vinyl. FIG. 2 is a schematic plan view of an example mold membrane 100, according to various embodiments. In the orientation of FIG. 2, the central longitudinal axis 114 of the mold membrane 100 points into the page and is represented by a cross representing the rear of an arrow to indicate direction. In these examples, the inner surface of the membrane body 104 has a circular cross section. In the embodiments of FIG. 2, the membrane body 104 is in the un-deformed state. The inner diameter of the membrane body 104 in the un-deformed state is indicated by the double arrow. In these examples, the inner diameter 202 is less than the outer diameter of the target object 102 provided on the outer surface 106 of the carrier object 108. Accordingly, in these embodiments the target object 102 provided on the outer surface 106 of the carrier object 108 does not fit in the space within the membrane body 104 (as defined by the inner diameter 202) in the un-deformed state. For example, the target object 102 provided as described fits within the membrane body 104 when deformation of the membrane body 104 has occurred to increase the space therein.

Figure 3:
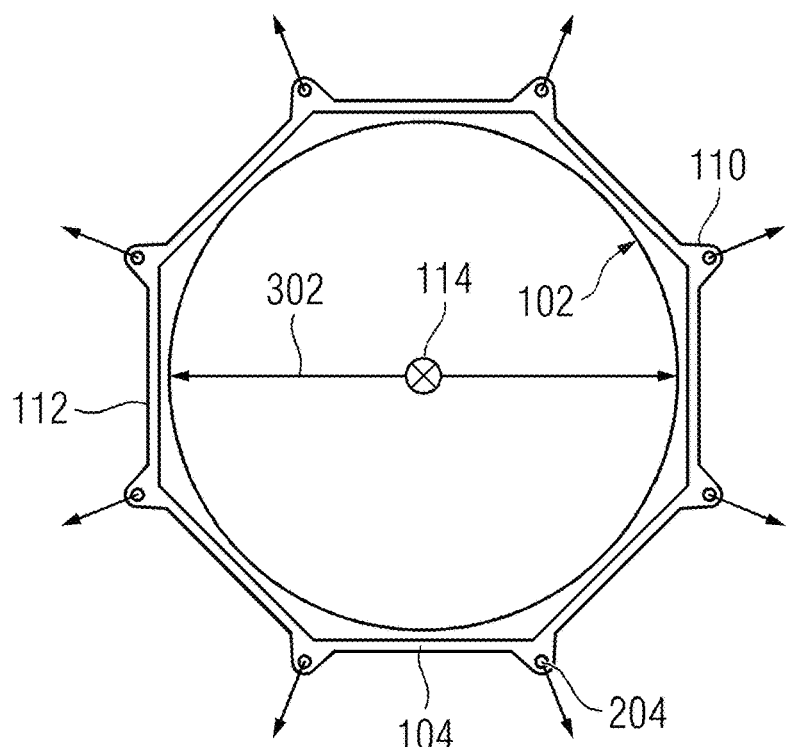
FIG. 3 is a schematic plan view of the example reusable mold membrane in a second state, according to one or more embodiments of the present disclosure.
Figure 4:
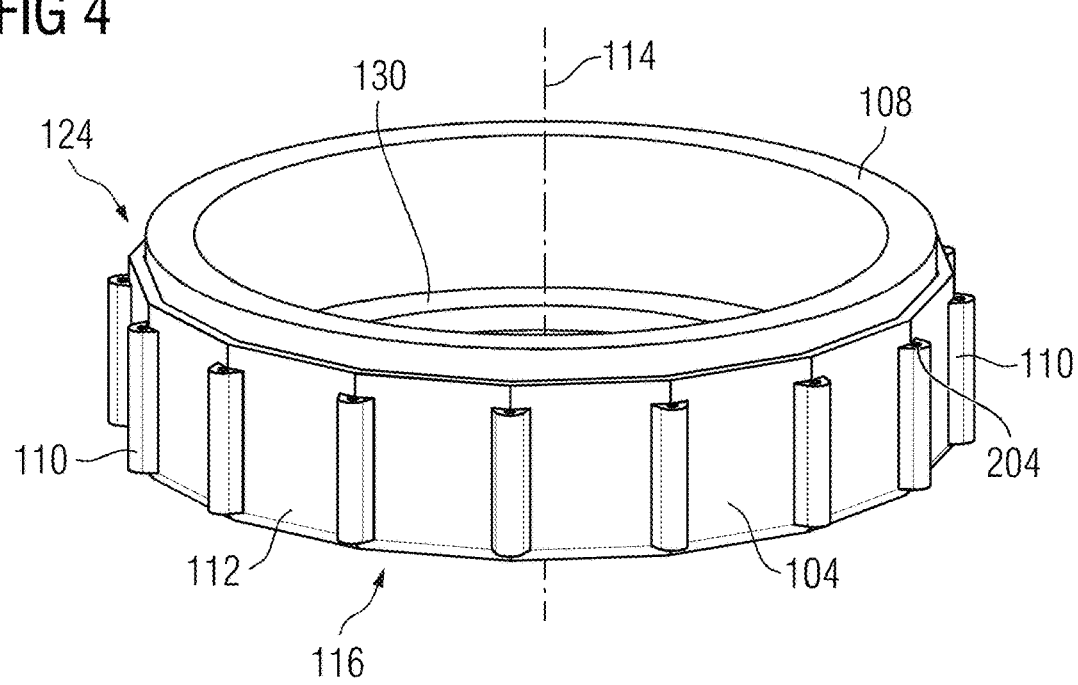
FIG. 4 is a second schematic perspective view of an example reusable mold membrane, according to one or more embodiments of the present disclosure.

FIG. 3 is a schematic plan view of the example mold membrane 100 and the example target object 102, according to various embodiments. FIG. 3 shows the target object 102 provided on the outer surface 106 of the cylindrical carrier object 108 inserted into the space within the membrane body 104 in a deformed state, according to embodiments. For simplicity, in FIG. 3 the target object 102 and the carrier object 108 are represented schematically as a circle labeled with numeral 102. However, it will be appreciated that the target object 102 is carried on the outer surface 106 of the carrier object 108. FIG. 4 is a schematic perspective view in which the target object 102 provided on the outer surface 106 of the cylindrical carrier object 108 is inserted into the space within the membrane body 104, while the membrane body 104 remains in a deformed state, according to embodiments.

The outer diameter of the of the target object 102 provided on the outer surface 106 of the carrier object 108 is indicated by the double-sided arrow labeled with numeral 302. For example, the membrane body 104 may be deformed to increase the space therein to accommodate the target object 102 with the larger outer diameter 302, as described below.

In these embodiments, the mold membrane 100 comprises a plurality of first manipulation structures 110. The first manipulation structures 110 are specific examples of manipulation structures that may deployed, and some other examples are described further below. The first manipulation structures 110 are provided on an outer part 112 of the membrane body 104. For example, the outer part 112 is the outward facing surface of the cylinder defined by the cylindrical membrane body 104. In other words, the outer part 112 is the surface of the membrane body 104 that faces in a direction away from the central longitudinal axis 114. In the Figures, only some of the first manipulation structures 110 are labeled with a reference numeral. However, it can clearly be seen that in these embodiments there are a number of first manipulation structures 110 provided around the outer part 112. In embodiments, the number of the manipulation structures may vary. In some examples, there may be three or more first manipulation structures 110. For example, eight first manipulation structures 110 may be provided spread around the outer part 112.

The first manipulation structures 110 are integral with the remainder of the membrane body 104 and comprise resiliently deformable material protruding out from the outer part 112 in a direction away from the central longitudinal axis 114.

In embodiments, each of the plurality of first manipulation structures 110 are configured to be manipulated by application of mechanical force to control the space within the membrane body 104 by controlling the amount of deformation of the membrane body 104. For example, the first manipulation structures 110 provide structures at which force can be applied to the membrane body 104 to deform the membrane body 104. For example, the first manipulation structures 110 are sites where mechanical force can be applied to deform a region of the membrane body 104 local to the manipulation structure 110 in question.

Referring to the embodiments shown in FIG. 3, force is applied to each of the first manipulation structures 110 in a direction perpendicular to and away from the central longitudinal axis 114 (as shown by arrows originating from each first manipulation structure 110 in FIG. 3). As a result of the force applied to each of the first manipulation structures 110, the membrane body 104 is deformed such that the space within the membrane body 104 is increased. Creating more space within the membrane body 104 provides for the target object 102 with outer diameter 302 to be accommodated.

The first manipulation structures 110 may take various different forms to provide for the membrane body 104 to deform in the manner described herein. Some example manipulation structures (such as the first manipulation structures 110, among other examples) are described in further below. However, those skilled in the art will appreciate that other kinds of structures to perform the described functions are possible.

In some embodiments, one or more of the plurality of manipulation structures comprises an elongate through hole. In the examples of through holes shown in the figures, the through holes extend in a direction substantially parallel to the central longitudinal axis 114 of the cylindrical membrane body 104 in the un-deformed state. For example, the first manipulation structures 110 comprise elongate through holes. Other embodiments of the manipulation structures may not comprise through holes, as described later with respect to FIGS. 9 to 11.

FIGS. 1 to 8 relate to embodiments of the first manipulation structures 110 comprising through holes. In these embodiments, the first manipulation structures 110 comprises through holes 204 which are elongated as shown. In other words, in these embodiments, the elongated through hole extends generally in the same direction as the central longitudinal axis 114 in the undeformed state. It will be appreciated that, as used herein, "substantially parallel" does not require the elongated through holes to be precisely parallel, but covers the elongated through holes extending generally (e.g., somewhat) in the same direction as the central longitudinal axis 114. In other embodiments, not all of the manipulation structures of the mold membrane 100 may be the first manipulation structures 110 comprising the described through holes.

Figure 5:
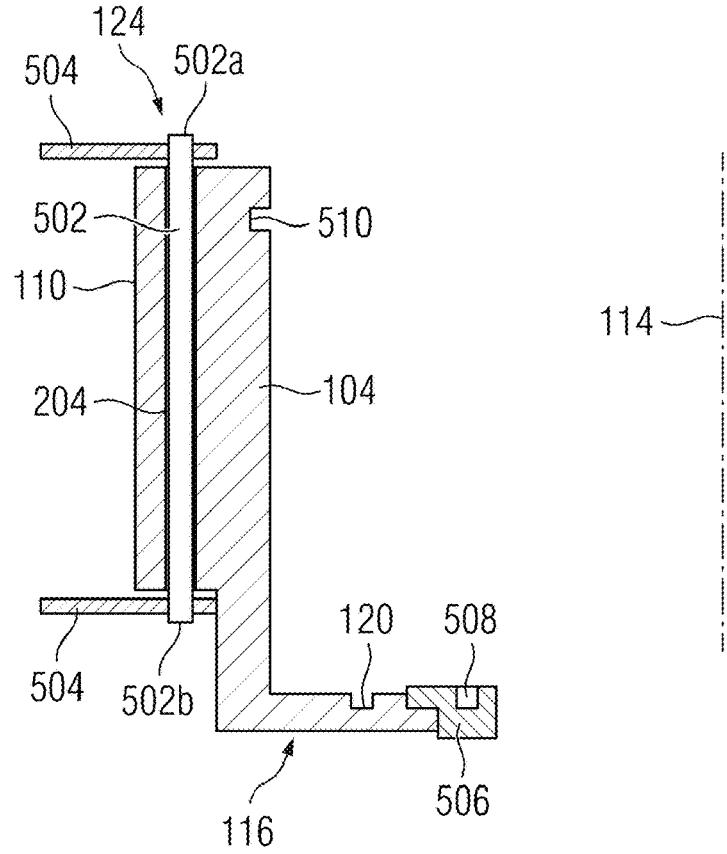
FIG. 5 is a first side cross-sectional partial view showing a first example manipulation structure, according to one or more embodiments of the present disclosure.
Figure 6:
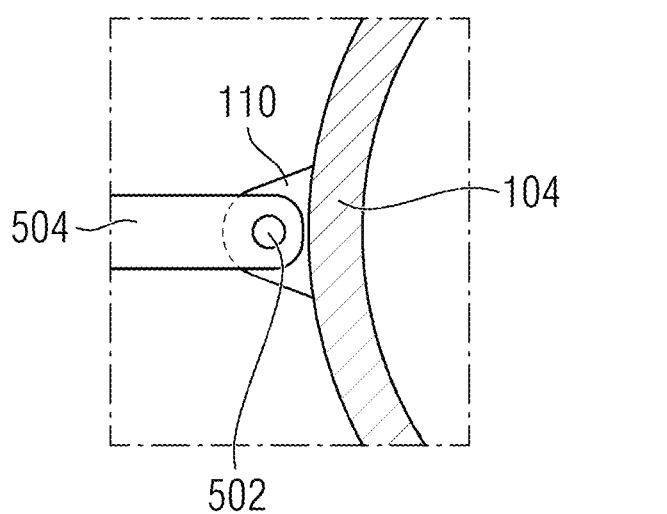
FIG. 6 is a schematic partial plan view of the first example manipulation structure, according to one or more embodiments of the present disclosure.

FIG. 5 is a side cross-sectional partial view showing the first manipulation structure 110, according to various embodiments. In the embodiments of FIG. 5, the cross section is taken through the through hole 204 of the first manipulation structure 110 shown.

In some such embodiments, the through hole 204 is configured to receive an elongated manipulation member 502 such that applying a force to an end of the elongate manipulation member 502, in a direction perpendicular to the central longitudinal axis 114, causes the membrane body 104 in the vicinity of the respective first manipulation structure 110 to deform. It should be noted that the application of a force with a non-zero component parallel to the central longitudinal axis 114 is not excluded. During use as described herein, components of force in a direction perpendicular to the central longitudinal axis 114 are relevant to the deformation affecting the space within the membrane body 104. Accordingly, the present description focuses on force in a direction perpendicular to the central longitudinal axis 114.

In the embodiments of FIG. 5, the elongated manipulation member 502 comprises a first manipulation member end 502a and a second manipulation member end 502b. In these embodiments, the elongated manipulation member 502 is longer than the through hole 204. For example, the elongated manipulation member 502 may be received in the through hole 204 such that the first manipulation member end 502a and the second manipulation member end 502b protrudes out from the through hole 204. In these examples, each of the ends 502a, 502b is connected to an actuation mechanism 504. For simplicity, the actuation mechanism 504 is depicted simply as elements connecting to the first and second manipulation member ends 502a, 502b. For example, the elongated manipulation member 502 may be provided in the form of a pin. The ends 502a, 502b of the pin may be connected to the actuation mechanism 504 using various different means, which those skilled in the art will appreciate.

The actuation mechanism 504 may be any suitable actuation mechanism that can be used to provide a mechanical force suitable for acting on the elongate manipulation member 502. For example, the actuation mechanism may comprise an electronic actuation system (e.g., electrical motors), a pneumatic actuation system, a hydraulic system, a mechanical actuation system, etc. In some embodiments, the actuation mechanism 504 may include a combination of such systems. For example, a mechanical system may be used to open and close the mold membrane as a whole (e.g., when creating space therein for the target object 102 and carrier object 108 to be inserted), and pneumatic actuators may be used individual manipulation structures (e.g., to manipulate local regions of the membrane body 104). It will be appreciated that the type of actuation mechanism used may depend on the size of the membrane body 104, amount of force required to deform the membrane body 104, and the like. For example, an embodiment of the membrane body 104 suitable for use in encapsulating magnetic coils for MRI imaging may be large and require relatively large forces to cause the desired amount of deformation. In some such embodiments, a hydraulic actuation system may be suitable.

The actuation mechanism 504 may be automatically controlled. For example, the actuation mechanism 504 may be controlled without manual intervention from a user (other than the user input control commands into a control system of the actuation mechanism 504, for example). For example, the actuation mechanism 504 may facilitate computer control in that control signals are input to the actuation mechanism 504 from a computer. In some embodiments, the actuation mechanism 504 is configured to apply mechanical force to all the manipulation structures provided. In such examples, the actuation mechanism 504 may be configured such that force is applied independently to each manipulation structure, and each manipulation structure is therefore independently controlled. In some embodiments, a separate actuation mechanism is provided for each manipulation structure for independent control.

Accordingly, the various manipulation structures may be controlled automatically. The various manipulation structures may be independently manipulated and deform local regions of the membrane body 104. Advantageously, this provides for a high level of control of the membrane body 104 and how it forms the outer mold over the target object 102. Furthermore, the automated nature of the manipulation of the membrane body 104 provides efficiency saving (for example, in terms of time and amount of work required by users) as compared to typical methods of applying flexible molds involving manual manipulation by hand, for example. For example, avoiding manual manipulation may also provide consistently repeatable results. The automatic manipulation also provides for manipulation at different stages of the encapsulation process, for example, as may not be possible when manual manipulation is relied upon. For example, automatic manipulation using the manipulation structures may be utilized inside of a chamber (e.g., an autoclave) where manual manipulation is not possible. The manipulation structures also provide for the mold membrane 100 to be removed after a molding process to encapsulate the target object 102 has been completed. For example, due to the controlled manipulation provided by the described mold membrane 100, the mold membrane 100 may be removed in a controlled manner without significantly disturbing the encapsulated target object 102 in an undesired manner. Removal in a controlled manner may also avoid causing damage to the mold membrane, the cured substance, and/or the target object. The described embodiments of the mold membrane 100 provide for the mold membrane 100 to be reused.

Returning to the embodiments of the first manipulation structures 110, in these embodiments, applying a force to each end 502a, 502b of the elongated manipulation member 502 in a direction perpendicular to the central axis 114 and away from the central axis 114 causes the membrane body 104 to deform in such a way that more space is created within the membrane body 104. For example, parts of the membrane body 104 close to the first manipulation structure 110 in question deform when the elongated manipulation member 502 pulls the first manipulation structure 110 away from the central axis 114. For example, see FIGS. 3 and 4. In the orientation of FIG. 5, the central axis is positioned to the right of the first manipulation structure 110.

In these embodiments, a force may be applied at each first manipulation structure 110, as shown in FIGS. 3 and 4 for example, to stretch the membrane body 104 so that the target object 102 provided on the carrier object 108 can be inserted into the space within the membrane body 104. Once the target object 102 is positioned within the membrane body 104 as desired, the manipulation structures may be manipulated (for example, by reducing the force applied to the elongate manipulation members 502) to allow the membrane body 104 to contract onto the target object 102. In these embodiments, due to the stretching, there is a spring force urging the membrane body 104 to return to the un-deformed state. For example, the force applied by the actuation means 504 in a direction away from the central axis 114 is reduced or removed to allow the membrane body 104 to contract. This spring force provides for a tight fit of the membrane body 104 onto the target object. In embodiments, the un-deformed inner diameter of the membrane body may be chosen such that there is an appropriate spring force to cause the membrane body 104 to form a tight fit against the desired target object 102.

In some embodiments, force may be applied at the first manipulation structures 110 in a direction towards the central longitudinal axis 114. Such force may aid in forming a tight fit against the desired target object 102. In some embodiments, a combination of force away from and towards the central longitudinal axis 114 may be used to adjust the membrane body 104, as desired.

Providing a resilient deformable membrane for forming a tight fit is advantageous, for example, because a tight fit may be achieved independently of variations in the size of the target object 102. For example, even if the mold membrane is intended for use with a specific outer diameter 302 for the target object 102, there may be variation in the exact outer diameter 302 depending on the procedure for providing the target object 102 on the carrier object 108. For example, in some instances the target object 102 may have an outer diameter larger or smaller as compared to other instances. In embodiments where the target object 102 is a coil, each time a coil is wrapped around a carrier object there may be some variation in the outer diameter. However, the inner diameter 202 and deformation characteristics of the membrane body 104 may be selected so as to accommodate for such variations. In this manner, the same membrane body 104 may be used to consistently form a tight fit on a number of target objects with some variation in sizes. Whereas a rigid/hard outer mold would not be adaptable to such variation, the flexible mold membrane described herein may readily for tight-fitting outer molds despite such variations in outer diameter 302.

In some embodiments, a given example of the reusable mold membrane 100 may be used to form a mold on target objects of different desired sizes (e.g., having various different values for the outer diameter 302 by design). This is because, the membrane body 104 deforms and then contracts onto the target object, and is therefore capable of forming a tight-fitting outer mold for a range of outer diameters 302 (within reasonable ranges depending on the elasticity of the reliantly deformable material and other parameters, for example).

Additionally, the described membrane body 104 may advantageously provide a tight fit at all the relevant regions of the target object irrespective of local variations in size and shape. For example, the resiliently deformable material of the membrane body 104 may reach into local gaps in the target object 102 when the membrane body 104 contract. This may be particularly advantageous in the embodiments of a coil wound around the carrier object 108.

The above are examples of various advantages of the described embodiments.

Figure 7:
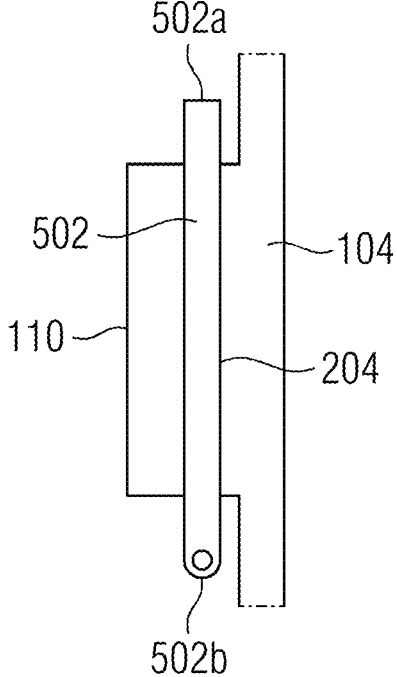
FIG. 7 is a second side cross-sectional partial view showing the first example manipulation structure, according to one or more embodiments of the present disclosure.
Figure 8:
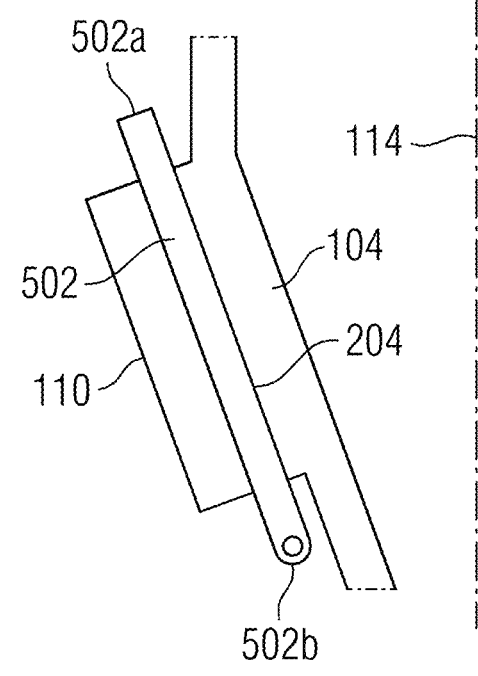
FIG. 8 is a third side cross-sectional partial view showing the first example manipulation structure, according to one or more embodiments of the present disclosure.

Returning to the embodiments of FIG. 5, in some embodiments force may be applied differently to one end of the elongated manipulation member 502 compared to the other end. For example, more force may be applied by the actuation mechanism 504 to the first manipulation member end 502a as compared to the second manipulation member end 502b. FIGS. 7 and 8 are schematic partial cross-sectional views of the first example manipulation structure 110, according to various embodiments. FIG. 7 shows the membrane body 104 in an un-deformed state. The arrow 602 indicates force applied to the first manipulation member end 502a of the elongate manipulation member 502 to transition the membrane body 104 from the un-deformed state shown in FIG. 7 to a deformed state as shown in FIG. 8. In these embodiments, the actuation mechanism 504 is not shown for simplicity. In these embodiments, no force is applied at the second manipulation member end 502b of the elongate manipulation member 502. Accordingly, in these embodiments, the second manipulation member end 502b acts as a fulcrum and the elongate manipulation member 502 pivots to form an angle relative to the central axis 114 as shown. This is an example of another manner in which the membrane body 104 may be manipulated. Those skilled in the art will appreciate that the membrane body 104 may be manipulated in the vicinity of the first manipulation structure 110 in question in various ways by differently applying mechanical force at the first manipulation member end 502a and/or the second manipulation member end 502b, depending on the application.

In some embodiments, one or more of the plurality of manipulation structures comprises an embedded manipulation member that is embedded within the membrane body 104. In such embodiments, the manipulation structure also comprises one or more attachment structures (930) attached to the embedded manipulation member which protrude from the membrane body (104) in a direction away from the central longitudinal axis 114 of the membrane body 104 embedded manipulation member. The manipulation structure according to such embodiments is different from the previously-described first manipulation structure 110 in that it comprises the embedded manipulation member instead of the through hole 204 for receive the elongated manipulation member 502.

Figure 9:
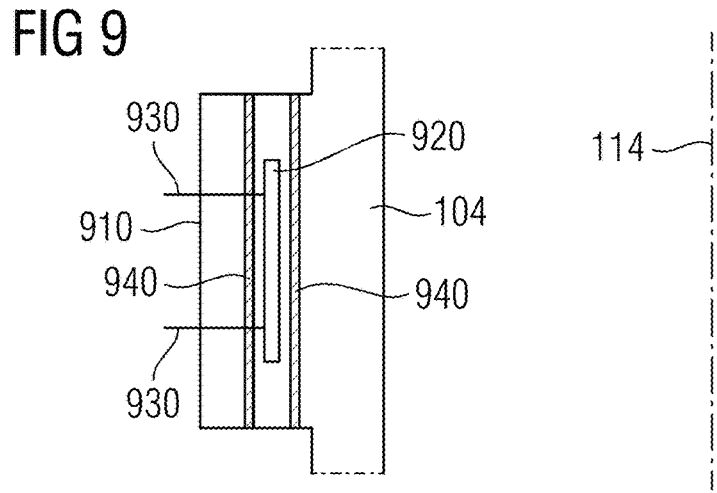
FIG. 9 is a schematic partial side cross-sectional view of a second example manipulation structure, according to one or more embodiments of the present disclosure.

FIG. 9 is a schematic partial plan side cross-sectional view showing a second example manipulation structure 910, according to various embodiments. The second manipulation structure 910 is another embodiment of a manipulation structure configured to be manipulated by application of mechanical force to control the space within the membrane body 104 by controlling the amount of deformation of the membrane body 104. In FIG. 9, elements which correspond to elements described with respect to the first manipulation structure 110 are labelled with the same reference numerals as in the preceding Figures. The outer part of the membrane body 104 may comprise a plurality of manipulation structures as described in relation to FIGS. 1 to 8, or a plurality of manipulation structure as described below in relation to FIG. 9. Alternatively, the membrane body 104 may comprise a plurality of manipulation structures including one or more of the first manipulation structures as described in relation to FIGS. 1 to 8 and one or more of the second manipulation structures as described in relation to FIG. 9. It should be noted that other embodiments of manipulation structures are possible. For example, given the disclosure herein to include manipulation structures configured to be manipulated by application of mechanical force to control the space within the membrane body 104 by controlling the amount of deformation of the membrane body 104, those skilled in the art will appreciate the various ways in which such manipulation structures may be provided.

In these embodiments, the second manipulation structure 910 comprises the embedded manipulation member 920, as shown in FIG. 9. In these embodiments, the second manipulation structure 910 comprises one or more attachment structures 930 attached to the embedded manipulation member 920. In some embodiments, the attachment structures 930 are integral with the embedded manipulation member 920. In other words, in some embodiments, the attachment structures 930 and the embedded manipulation member 920 together are provided as a single piece. In other embodiments, the attachment structures 930 are separate pieces which are attached onto the embedded manipulation member 920.

In these embodiments, the attachment structures 930 protrude from the membrane body 104 in a direction away from the central longitudinal axis 114 of the membrane body 104. For examples, the attachment structures 930 extend outwardly with respect to the outer part 112 of the membrane body 104. For example, the attachment structures 930 are partially embedded within the material of the membrane body 104. In the examples of FIG. 9, there are two attachment structures 930. However, any number of attachment structures 930 may be provided, as desired. In some embodiments, the number of attachment structures 930 may depend on the shape and/or size of the embedded manipulation member 920.

For example, the embedded manipulation member 920 is configured such that applying a force to the attachment features 930, in a direction perpendicular to the central longitudinal axis 114, causes the membrane body 104 in the vicinity of the second manipulation structure 910 to deform. In these embodiments, the embedded manipulation member 920 may be a rigid plate (for example, comprising a metal or other material which forms a rigid plate of appropriate dimensions). In some embodiments, the embedded manipulation member 920 is a rigid rectangular plate or a rigid circular plate. For example, the rigid plate may be embedded in the sense that the rigid plate is molded into the resiliently deformable material of the second manipulation structure 910. For example, the plate may be oriented such that it faces substantially in the same direction as the outer part 112 (i.e., the outer surface of the membrane body 104).

Figure 10:
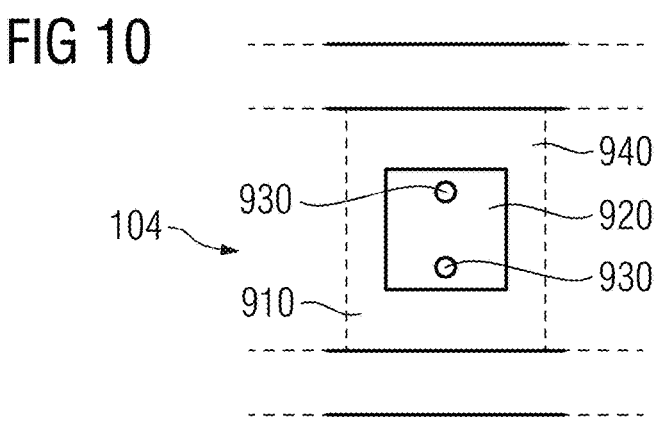
FIG. 10 is a first schematic partial front cross-sectional view of the second example manipulation structure, according to one or more embodiments of the present disclosure.

In the embodiments of FIG. 9, the rigid plate is entirely embedded within the material of the membrane body 104. FIG. 10 is a schematic partial side cross-sectional view of the second manipulation structure 910, according to various embodiments. The horizontal dashed lines indicate that the structures continue beyond what is shown in FIG. 10. In these embodiments, the embedded manipulation member 920 is a rectangular plate.

In some embodiments, the embedded manipulation member 920 may be partially embedded into the resiliently deformable material at the site of the second manipulation structure 910 such that two ends of the embedded manipulation member 920 protrude, as described below, for example.

Figure 11:
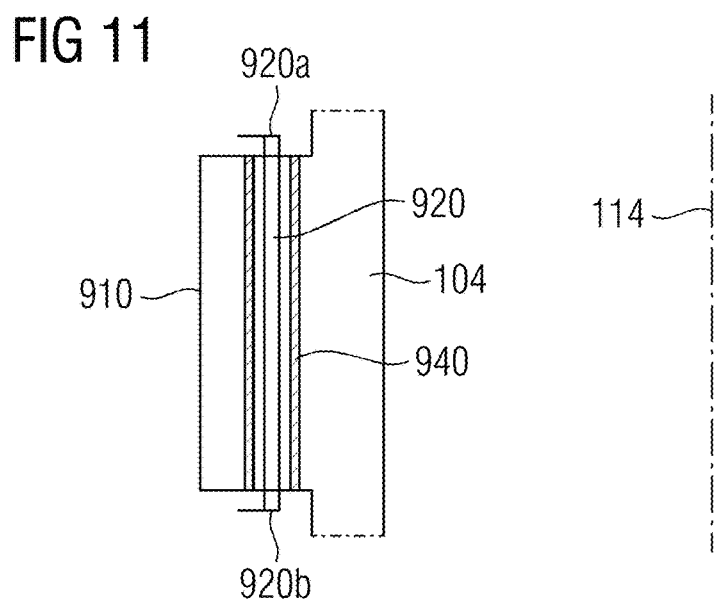
FIG. 11 is a second schematic partial plan cross-sectional view of the second example manipulation structure, according to one or more embodiments of the present disclosure.

FIG. 11 is a schematic partial side cross-sectional view of the second manipulation structure 910, according to various embodiments. The embodiments of FIG. 11 are different to the embodiments of FIGS. 9 and 10 in that the embedded manipulation member 920 is partially embedded. In the embodiments of FIGS. 11, two ends of the embedded manipulation member 920 protrude out from the resiliently deformable material (e.g., protrude out from the remainder of the second manipulation structure 910). For example, two ends of the embedded manipulation member 920 protrude out at different positions with respect to the central longitudinal axis 114 (see FIG. 11). In these embodiments, the embedded manipulation member 920 comprises a first embedded member manipulation end 920a and a second embedded member manipulation end 920b, each provided at a different end of the embedded manipulation member 920 which protrudes as described. In the orientation shown in FIG. 11, the first embedded member manipulation end 920a is a top embedded member manipulation end, and the second embedded member manipulation end 920*b* is a bottom embedded member manipulation end.

The embedded member manipulation ends 920*a*, 920*b* may comprise attachment structures 930. For example, the attachment structures 930 are configured to engage with the actuation mechanism 504 (not shown in FIGS. 9, 10, and 11), for example. Those skilled in the art will appreciate the various ways in which the embedded member manipulation ends 920*a*, 920*b* may be coupled to an actuation mechanism. As an example, the attachment structure 930 may be in the form of an attachment ring, an attachment through hole, an attachment threaded hole, or any other suitable type of structure that provides for mechanical coupling with the actuation mechanism.

The second manipulation structure 910 may function in the same manner as described above in relation to first manipulation structure 110. Therefore, a description of common features, functions, advantages, and the like is omitted for brevity. The described manipulation structures provide a way for mechanical force to be applied at a given site of the membrane body 104 so as to manipulate the membrane body 104 and take advantage of the elasticity of the resiliently deformable material.

In some embodiments, the mold membrane 100 comprises a first seal arrangement provided towards a first end of the mold membrane 100. In these embodiments, the first seal arrangement is configured to form a seal against the carrier object 108. In embodiments, the first end of the mold membrane 100 is at a particular position with respect to the central axis 114. For example, a second end opposite to the first end of the mold membrane 100 is a different position with respect to the central axis 114.

In the embodiments of FIGS. 1, 4, and 5 for example, there is labelled the first end 116 of the mold membrane 100. In the orientation shown in these Figures, the first end 116 of the mold membrane 100 is the bottom end of the mold membrane 100. For example, the first seal arrangement is provided at a location where the membrane body 104 does not contact the target object 102, in use.

The first seal arrangement may be of any form or construction which provides for a seal to be formed. In some embodiments, the seal formed by the first seal arrangement is a seal preventing or significantly inhibiting flow of a liquid material out from between the mold membrane 100 and the carrier object 108. In some embodiments, the seal formed by the first seal arrangement is a vacuum seal (in other word prevents/significantly inhibits flow of air/gas molecules). The tightness of the seal formed by the first seal arrangement (and therefore the particular example of the first seal arrangement deployed) may be selected according to the application. In some application, only a seal to prevent flow of liquids may be desired. In some other applications, a vacuum seal may be desired.

In some embodiments, the membrane body 104 comprises a flange 118 towards the first end 116. In these embodiments, the flange 118 extends into the membrane body 104. For example, the flange 118 extends towards the central longitudinal axis 114. In these embodiments, the flange 118 is provided all the way around the cylindrical membrane body 104, as shown in FIG. 1, for example. The flange 118 is part of the membrane body 104 and therefore comprises the resiliently deformable material.

In the embodiments of FIG. 1, the first seal arrangement is labelled with the numeral 120. In some embodiments, the first seal arrangement 120 is provided on the flange 118, as is the case in the examples of FIG. 1. However, in some embodiments, the flange may be omitted and the first seal arrangement 120 may be provided on another part of the membrane body 104. In such embodiments, the membrane body 104 may have a ring like structure. In some embodiments, the flange 118 may be present, but the first seal arrangement 120 may nevertheless be provided on a part of the membrane body 104 other than on the flange 118.

For example, the flange 118 contacts an end surface (e.g., a bottom surface) with respect to the central axis 114 of the carrier object 108. In the orientation shown in FIG. 1, the flange 118 contacts the bottom surface (not visible) of the carrier object 108.

In some examples, the first seal arrangement 120 takes the form of a channel formed in the flange 118 where the resiliently deformable material does not contact the carrier object 108. For example, the channel creates a region where there is air or space between the resiliently deformable material and the carrier object 108, as compared to other regions. Referring again to FIG. 5, in these embodiments, the first seal arrangement 120 is in the form of the described channel. For example, the first seal arrangement 120 may extend all the way around the flange 118 so as to form a ring like channel surrounding the central axis 114.

The first seal arrangement 120 of these embodiments functions to create a seal under vacuum for example. For example, when a vacuum is applied, air within the channel forming the first seal arrangement 120 is evacuated. This causes the flange 118 to press forcefully (depending on the strength of the vacuum, the exact structure of the channel and the like) against the carrier object 108 forming a seal.

The channel of the embodiments of FIG. 5 is provided a given distance away from where the flange 118 meets the cylindrical part of the membrane body 104. For example, the given distance may be selected to ensure that the seal created by evacuating the channel is not compromised when the membrane body 104 deforms as described.

In some embodiments in which the first seal arrangement 120 is provided on a part of the membrane body 104 other than the flange 118 (irrespective of whether or not the flange 118 is provided), the first seal arrangement may be in the form of a channel on an inward facing surface (a surface facing the central longitudinal axis 114) of the membrane body 104, for example.

In other embodiments, the first seal arrangement 120 may provide other means for sealing the flange 118 (or another part of the membrane body 104, depending on the example deployed) to the carrier object 108. For examples, there may be provided various embodiments of fixing mechanisms (as part of the first seal arrangement 120) to fix the flange 118 to the carrier object 108 to form a seal. Those skilled in the art will appreciate that there are various ways of fixing, attaching, and/or clamping one object to another forcefully enough to create the desired seal. In some embodiments, the first seal arrangement 120 comprises a suitable type of mechanical clamp. These other embodiments of the first seal may be deployed on the flange 118 or another part of the membrane body 104, for example.

For example, in some embodiments the first seal arrangement 120 may comprise a strap which is positioned around the outer part 112 of the membrane body 104. The strap may function by tightening around the membrane body 104 and forcefully pressing the membrane body 104 against the carrier object 108 (e.g. in the vicinity of the strap).

In some embodiments, the mold membrane 100 comprises a second seal arrangement provided towards a second end of the mold membrane 100. The second end of the mold membrane 100 is opposite to the first end 116 of the mold membrane 100. In the examples of FIGS. 1, 4 and 5, there is labelled the second end 124 of the mold membrane 100. In the orientation shown in these figures, the second end 124 is the top end of the mold membrane 100. For example, the second seal arrangement is provided at a location where the membrane body 104 does not contact the target object 102, in use.

Referring to FIG. 5, there is shown an example second seal arrangement 510 towards the second end 124 of the mold membrane 100. For example, the described first seal arrangement 120 and the second seal arrangement 510 are positioned such that the region of the membrane body 104 which comes into contact with the target object 102 is between the first and second seal arrangements. In these embodiments, seals are formed around the target object 102 in contact with the membrane body 104.

For example, the second seal arrangement 510 is configured to form a seal against the carrier object 108 positioned within the membrane body 104. In the embodiments of FIG. 5, the second seal arrangement 510 comprises a channel provided in the inward facing surface (the surface facing the central longitudinal axis 114) of the membrane body 104. In these embodiments, the second seal arrangement 510 takes the form of a channel as previously described in relation to the first seal arrangement 120. In other embodiments, the second seal arrangement 510 may comprise other means of forming a seal such as a mechanism of fixing (e.g., clamping and the like) the membrane body 104 to the carrier object 108 towards the second end 124. Those skilled in the art will appreciate that there are various ways of fixing, attaching, and/or clamping one object to another forcefully enough to create the desired seal. In some embodiments, the second seal arrangement 510 comprises a suitable type of mechanical clamp. In some embodiments, the second seal arrangement 510 is configured to form a seal on a surface of the carrier object 108 which is substantially perpendicular to the outer surface 106 (e.g., the top surface of the carrier object 108 in the orientations of FIGS. 1, 4 and 5).

For example, in some embodiments the second seal arrangement 510 may comprise a strap which is positioned around the outer part 112 of the membrane body 104 and functions by tightening around the membrane body 104 to forcefully press the region of the membrane body 104 in the vicinity of the strap against the carrier object 108.

In some embodiments, there may be provided a second seal actuation mechanism which causes the second seal arrangement 510 to apply the seal. For example, the second seal actuation mechanism may be used to tighten a strap, apply a clamp and the like, depending on the construction of the second seal arrangement. For example, the second seal actuation mechanism operates independently to the mechanism(s) that actuate the manipulation structures. In such embodiments, the second seal actuation mechanism may be used to hold the second seal arrangement open when the membrane body 104 is stretch for insertion of the target object 102, for example.

In some embodiments, a pressure difference may be applied across the mold membrane 100, for example, by evacuating the volume between the mold membrane 100 and the carrier object 108, and/or applying external pressure to the mold membrane 100. For example, the pressure difference may be used to cause the substance (e.g., resin) to fill the space around the target object 102. In some embodiments, the pressure difference may aid in pressing the membrane body 104 to press up against the target object 102. In some embodiments, a combination of evacuating the volume between the mold membrane 100 and the carrier object 108 and applying external pressure is used.

As described above, some embodiments of the mold membrane 100 comprise the first seal arrangement 120. In some embodiments, both the first seal arrangement 120 and the second seal arrangement 510 may be provided. In some embodiments where a vacuum between the membrane body 104 and the carrier object 108 is desired, both the first and second seal arrangements 120, 510 may be provided in a manner that vacuum seals can be created either side of the target object. Such an embodiments may be deployed depending on the desired application.

For example, there may be embodiments where the first and second seal arrangements 120, 510 are provided and there is no vacuum in the space immediately outside the mold membrane 100. For example, this may be where the mold membrane 100 is not placed within an autoclave that is evacuated. In such examples, means for evacuating the air (e.g., tubes, pipes and the like) may be provided and configured to create a vacuum between the mold membrane 100 and the carrier object 108. In such embodiments, means (e.g., tubes, pipes and the like) may also be provided for introducing the substance (e.g., resin) into the space between the mold membrane 100 and the carrier object 108.

In these embodiments, when a vacuum is applied, the substance fills the gaps left by the removed air so as to coat the target object 102. In such embodiments where the seal arrangements take the form of the described channels, applying the vacuum also created the correspond seals.

In some embodiments in which the flange 118 is provided, the mold membrane 100 may comprise a rigid base structure connected to the flange 118 towards an innermost edge of the flange 118. For example, the rigid base structure may be a rigid ring. For example, the rigid base structure may be a rigid disk. In the embodiments of FIG. 1, there is provided a first rigid base structure 122 in the form of a rigid disc 122 connected to the flange 118. In the examples of FIG. 5, there is provided a second rigid base structure 506 in the form of a rigid ring. The first and second rigid base structures 122, 506 are examples of the described rigid base structure. The rigid base structure 122, 506 may comprise an appropriately rigid material such as a metal and the like, for example.

In some embodiments, the rigid base structure 122, 506 comprises a fixing mechanism to fix the rigid base structure 122, 506 to the carrier object 108. For example, in the embodiments shown in FIG. 5, the second rigid base structure 506 comprises a rigid ring fixing mechanism 508.

The fixing mechanism of the rigid base structure 122, 506 may be provided in various forms such as a clamping mechanism, a mechanism utilizing screws and/or bolts, and the like.

In some embodiments, the mold membrane 100 comprises a first alignment arrangement configured to engage with a second alignment arrangement such that the rotational alignment of the mold membrane about the central longitudinal axis 114 relative to the carrier object 108 is fixed. For example, the first and second alignment arrangements may also aid in generally positioning (not just rotationally) the carrier and target objects as desired within the mold membrane 100. For example, it may be desired that a particular part of the target object 102 be positioned at or near a particular location around the cylindrical membrane body 104. For example, correct alignment may also provide correct placement of the first and/or second seal arrangements so that the seals are not disturbed during any manipulation of the membrane body 104. The first and second alignment arrangements may be provided to achieve such alignment.

In the embodiments of FIG. 1, the mold membrane 100 comprises a first alignment arrangement 126 in the form of guide pins. In these particular embodiments, there are three guide pins at different angular positions around the central longitudinal axis 114. The guide pins are elongate such that they extend in a direction substantially parallel to the central longitudinal axis 114 when the membrane body 104 is in the un-deformed state. In embodiments where guide pins are utilized, any suitable number of guide pins may be used.

The guide pins may be provided in the rigid base structure 122, 506. For example, the guide pins may be provided on the rigid disc 122. In some other embodiments, the guide pins may be provided on the rigid ring. In some embodiments, the guide pins may be part of the membrane body 104 and may be provided on the flange 118, for example. For example, the guide pins may be molded into the resiliently deformable material which forms the flange 118.

In the embodiments of FIG. 1, the carrier object 108 comprises a second alignment arrangement 128. In these embodiments, the second alignment arrangement 128 is in the form of holes which receive the guide pins. In the particular embodiments shown in FIG. 1, the carrier object 108 comprises an inward extending flange 130 provided at a part of the carrier object 108 which contacts the flange 118. In use, the inward extending flange 130 is positioned towards the first end 116 of the mold membrane 100, in these embodiments. The second alignment arrangement 128 comprises through holes provided in the inward extending flange 130. The guide pins are received in the through holes in order to align the position of the target object 102 and the membrane body 104, as desired.

In other embodiments, other first and second alignment arrangements may be provided. For example, the mold membrane 100 may comprise a structure which engages with an inverse complementary structure on the carrier object 108 such that the relative rotational position between the mold membrane 100 and the carrier object 108 is fixed. For example, there may be provided one or more protrusions and/or recesses on the mold membrane 100 which engage with complementary one or more protrusions and/or recesses on the carrier object 108 such that the relative rotational position is fixed. Those skilled in the art will appreciate the various ways in which the relative rotational position may be fixed, given the embodiments described herein.

In some embodiments, each of the plurality of manipulation structures 110, 910 comprises manipulation structure fabric reinforcement molded into the respective manipulation structure 110, 910. In the examples of FIGS. 9, 10 and 11, there is provided manipulation structure fabric reinforcement 940. In these embodiments, the manipulation structure fabric reinforcement 940 comprises one or more fabric layer, for example, positioned around the embedded manipulation member 920. For example, the manipulation structure fabric reinforcement is confined to the respective manipulation structure.

Providing manipulation structure fabric reinforcement with examples of the manipulation structures may advantageously provide structural strength to said manipulation structures (for example, to avoid damage from forces applied by the actuation mechanism 504). In some embodiments, providing manipulation structure fabric reinforcement with embodiments of the manipulation structures may provide for control of the amount of deformation which occurs at said manipulation structures. For example, the fabric used may not be elastically deformable.

FIGS. 9, 10, and 11 are examples of fabric reinforcement within the manipulation structures. For example, there may be embodiments of the first manipulation structure 110 which also comprises fabric reinforcement. For example, fabric reinforcement may be provided in one or more layer to surround the elongate through hole 204. Any configuration and/or number of fabric reinforcement layers may be provided as part of embodiments of the manipulation structure, according to the desired amount of reinforcement.

Figure 12:
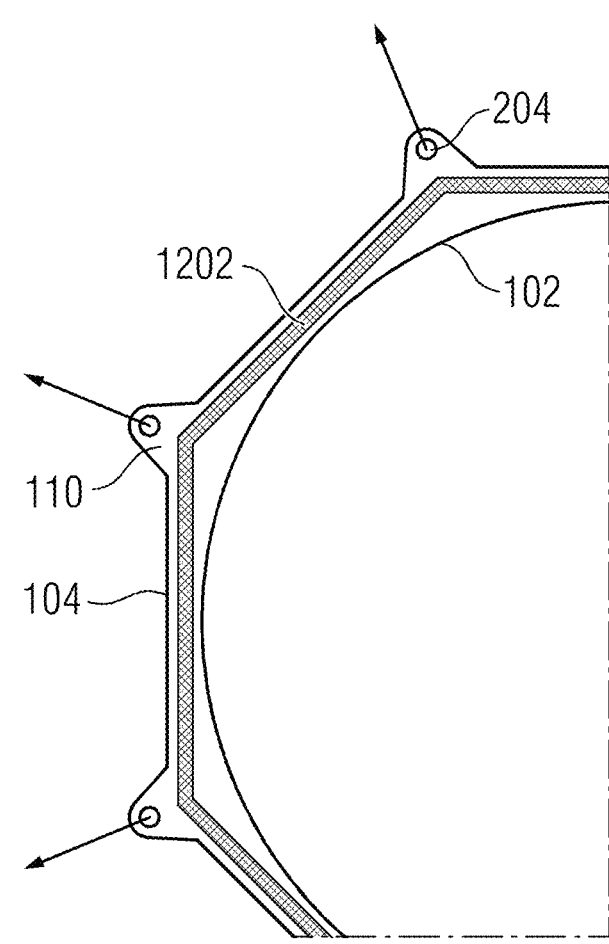
FIG. 12 is a schematic partial plan cross-sectional view of the example reusable mold membrane, according to one or more embodiments of the present disclosure.

In some embodiments, the membrane body 104 comprises membrane body fabric reinforcement to restrict the amount of deformation of the membrane body 104. FIG. 12 is a schematic plan cross-sectional partial view of the mold membrane 100 comprising membrane body fabric reinforcement 1202. In these embodiments, the membrane body fabric reinforcement 1202 comprises one or more continuous layers of fibric which surround the central longitudinal axis 114. The membrane body fabric reinforcement 1202 may extend the whole or part of the length of the membrane body 104 in a direction along the central longitudinal axis 114.

The membrane body fabric reinforcement 1202 may be used to restrict the amount by which the membrane body 104 can be deformed to create space therein and away from the central longitudinal axis 114.

As described above, in some embodiments both the first and second seal arrangements may be provided where a vacuum between the membrane body 104 and the carrier object 108 is desired. In some embodiments, the whole mold membrane may be placed within a chamber which is under vacuum (such as an autoclave, for example). In some such embodiments, the second seal arrangement may be omitted.

In some embodiments where the mold membrane is intended for use inside a chamber e.g., under vacuum, the first seal arrangement may create a seal tight enough to significantly inhibit or prevent flow of the substance for encapsulation, but not necessarily tight enough to be vacuum tight.

Figure 13:
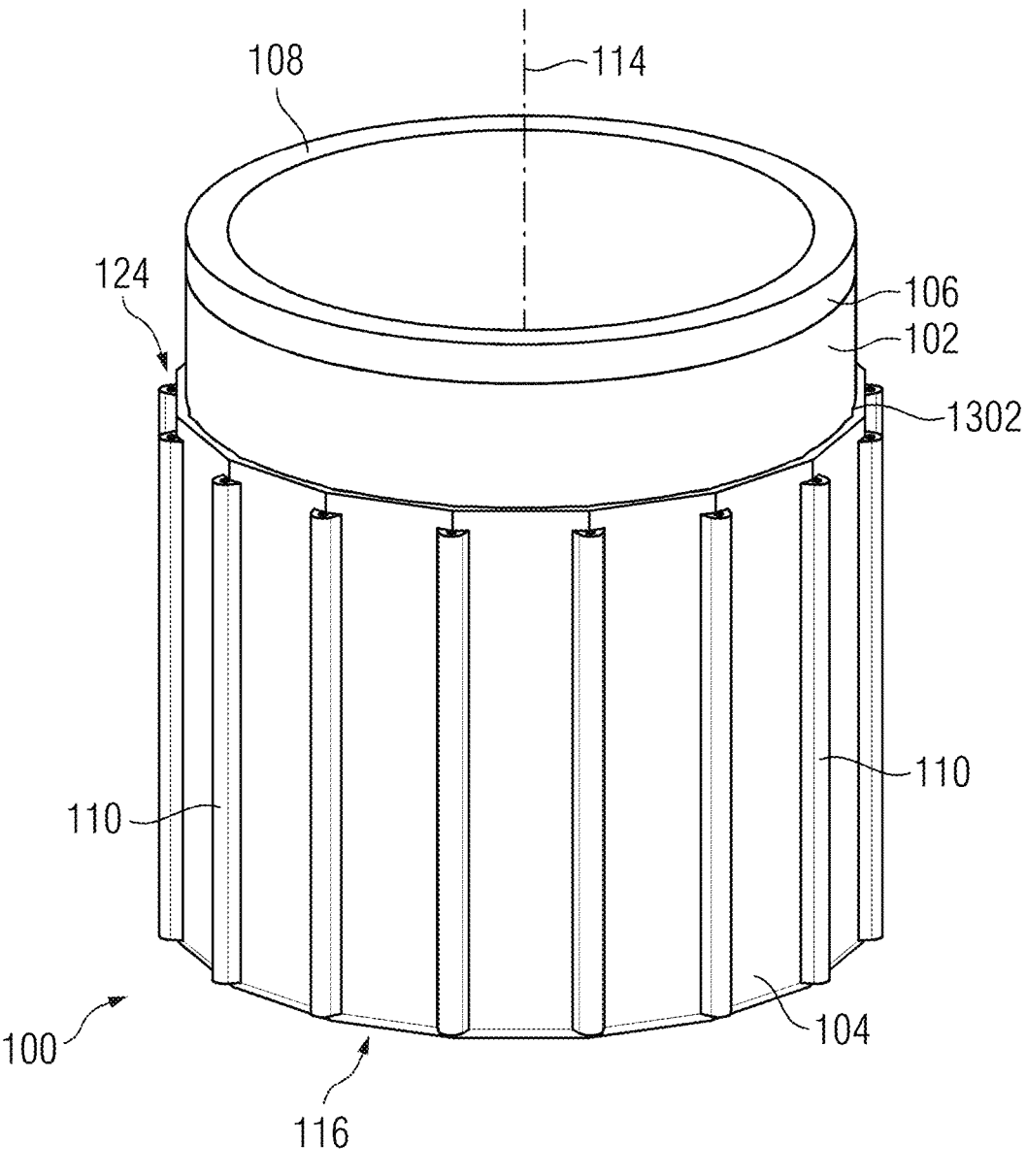
FIG. 13 is a schematic perspective view of the example reusable mold membrane, according to one or more embodiments of the present disclosure.

In some embodiments where the mold membrane is intended for use inside a chamber under vacuum, the mold membrane comprises a reservoir structure provided towards the second end 124 of the mold membrane. In these embodiments, the reservoir structure is for introducing the substance for encapsulation. FIG. 13 is a schematic perspective view of the mold membrane 100, according to embodiments. In the embodiments of FIG. 13, a different embodiment of the mold membrane 100 is shown than in the preceding Figures. In the embodiments of FIG. 13, the mold membrane 100 is similar to that described with respect to FIGS. 1 to 8 and may comprise any combination of the previously described features. For example, the mold membrane 100 of FIG. 13 may comprise a plurality of the described first manipulation structures 110, a plurality of the described second manipulation structures 910, or a combination thereof. In the embodiments shown in FIG. 13, a plurality of the first manipulation structures 110 are provided, according to examples.

As can be seen from FIG. 13, the mold membrane 100 has a larger dimension with respect to the central longitudinal axis 114 as compared to the previously described mold membrane embodiments. The dimensions of the mold membrane may be selected according to the desired application. In these embodiments, there is shown an example target object 102 provided on a carrier object 108 with an outer surface 106 different from the previously described target and carrier objects in their dimensions along the central longitudinal axis 114, as examples. For example, the mold membrane 100 of these embodiments is for use in encapsulating a coil which corresponds to a cylinder of a longer length, for example. The examples of FIG. 13 illustrate example dimensions different to the examples described previously.

In the embodiments of FIG. 13, the mold membrane 100 comprises a reservoir structure 1302. In these embodiments, the reservoir structure 1302 forms a funnel like receptacle in which a desired quantity of the substance can be held. In these embodiments, the reservoir structure 1302 extends all the way around, with respect to the central longitudinal axis 114, at the second end 124.

In use, the mold membrane 100 according to these embodiments may be placed within a vacuum chamber. The carrier object 108 carrying the target object may be positioned within the membrane body 104. When a vacuum is applied within the vacuum chamber in these embodiments, air between the membrane body 104 and the carrier object 108 is removed, and the substance held in the reservoir structure 1302 is drawn into the space left behind. In this manner, the entirety of the target object 102 may be covered in the desired substance.

Automated manipulation of the membrane body 104 may be particularly advantageous in applications in which the encapsulating process takes place inside of a closed chamber such as an autoclave. This is because manual manipulation is not possible once the typical mold is placed within a vacuum chamber. However, because the described embodiments provide a way to automate the manipulation using actuation mechanism(s), manipulation can take place inside a vacuum chamber. This provides for additional adjustment of the outer mold during various processes which take place inside the vacuum chamber.

Figure 17:
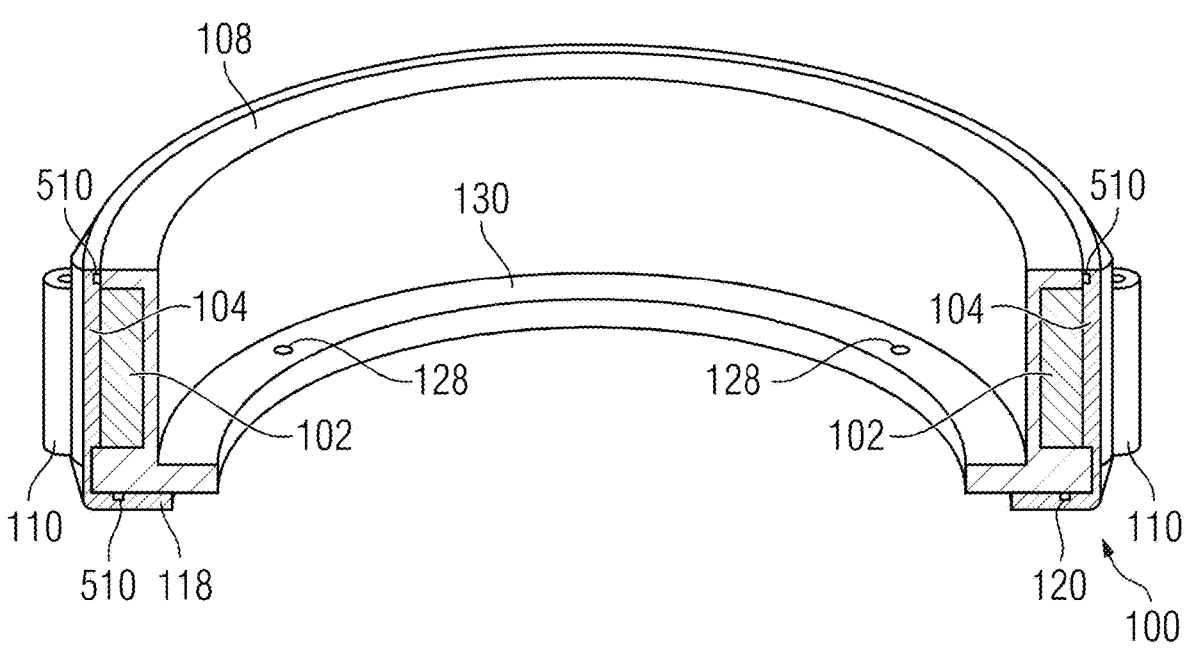
FIG. 17 is a schematic perspective cross-sectional view of the example reusable mold membrane, according to one or more embodiments of the present disclosure.

In the above-described embodiments, the outer surface of the carrier object corresponds to the outer surface of a plain cylinder. However, in other embodiments, the carrier object may comprise one or more flanges or protrusions which extend away from the central longitudinal axis 114, when the carrier object is positioned within the mold membrane as described. For example, the carrier object may have a shape similar to that of a bobbin and the like. FIG. 17 is a schematic perspective cross-sectional view of the mold membrane 100 forming an outer mold on the target object 102, according to examples. In these embodiments, the target object is carried on the carrier object 108, which comprises flanges as shown in FIG. 17. For example, there are flanges either side of a channel where the target object 102 is placed. In these embodiments, the membrane body 104 contracts onto the target object 102 so as to form a tight-fitting outer mold. Whatever is the shape of the carrier object, the example mold membrane for use with that carrier object has a membrane shaped appropriately such that a tight-fitting outer mold can be formed onto the target object.

Figure 15:
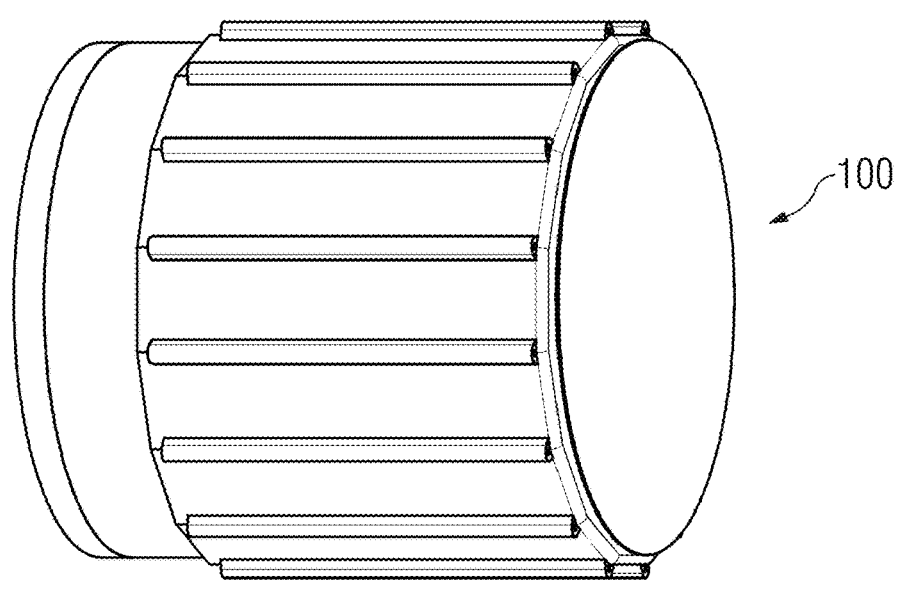
FIG. 15 is a schematic perspective view of the example reusable mold membrane, according to one or more embodiments of the present disclosure.
Figure 16:
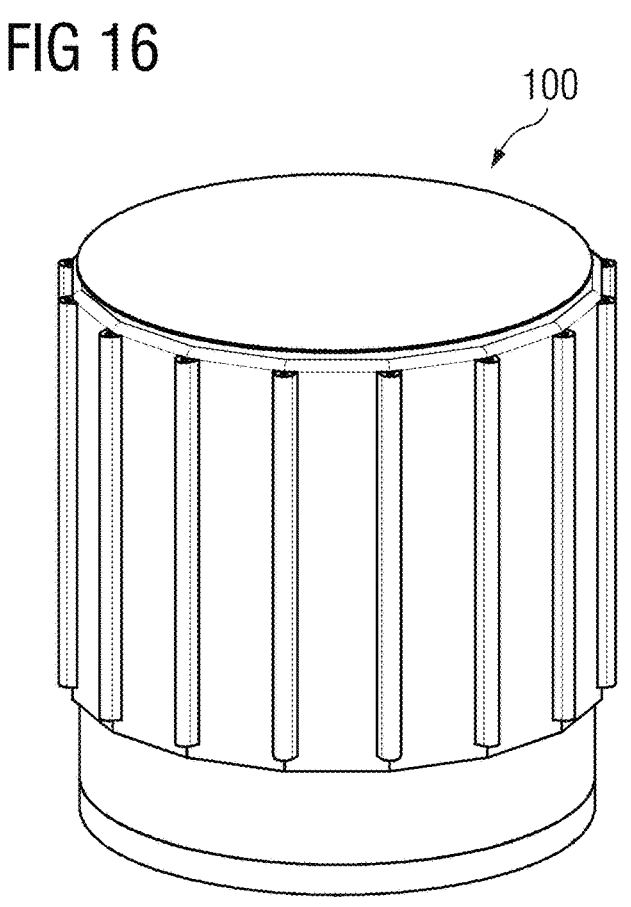
FIG. 16 is a schematic perspective view of the example reusable mold membrane, according to one or more embodiments of the present disclosure.

The mold membrane according to any of the described embodiments may be used in a method for use during a process to encapsulate the target object in the substance. It should be noted that in examples where the first and second seal arrangements 120, 510 are provided, the mold membrane 100 may be used in any orientation as desired. For example, FIG. 15 is a schematic perspective view of an example mold membrane 100 which is oriented horizontal with respect to the ground. For example, FIG. 16 is a schematic perspective view of an example mold membrane 100 which is oriented such that the positions of the first and second ends of the mold membrane 100 are swapped. In other words, in comparison to the orientation shown in FIG. 1, for example, the mold membrane 100 of FIG. 16 is upside down. In such embodiments, the mold membrane 100 may be lowered onto the carrier object. The presence of the first and second seal arrangements may provide for any orientation to be used.

FIG. 14 is a flow diagram illustrating a method 1400 for use during an example process to encapsulate the target object, according to various embodiments. More specifically, the method 1400 involves forming a tight-fitting outer mold during around the target. In the following description of the method 1400, reference is made to the embodiments described previously.

At block 1402 of the method 1400, a reusable mold membrane is provided to form the outer mold. The reusable mold membrane is a mold membrane according to any of the embodiments described herein. At method 1404 of the method 1400, the target object 102 is provided on the outer surface of the carrier object 108.

At block 1406 of the method 1400, the manipulation structures 110, 910 are manipulated to deform the cylindrical membrane body 104 such that the target object 102 provided on the carrier object is accommodated inside the space within the cylindrical membrane body 104. For example, as described above, the manipulation structures 110, 910 are used to manipulate the membrane body 104 by deforming it. As described above, the manipulation structures 110, 910 are sites where mechanical force can be applied to deform a region of the membrane body 104 local to the manipulation structure 110, 910 in question. For example, a mechanical force is applied at each manipulation structure 110, 910 in a direction away from the central longitudinal axis 114 to deform the membrane body 104 and create space therein, or in a direction towards the central longitudinal axis 114 to push the membrane body 104 towards the central longitudinal axis 114.

At block 1408 of the method 1400, the target object 102 provided on the carrier object 108 is inserted into the space within the cylindrical membrane body 104. For example, the target object 102 carried on the carrier object 108 is inserted into the space created by manipulating the membrane body 104 at block 1406.

FIG. 13 shows the target object 102 partially inserted into the membrane body 104. In various embodiments, at completion of block 1408, the target object is within the membrane body such that the target object is at a position where the membrane body can contract onto the target object forming a tight-fitting outer mold. For example, the examples of FIG. 4 show that the target object 102 (not visible in FIG. 4) is entirely within the cylindrical membrane body 104. It will be appreciated that it will be desired that the membrane body 104 cover the target object 102 entirely so as to form an effective tight-fitting outer mold.

At block 1410 of the method 1400, the manipulation structures 110, 910 are manipulated to allow the membrane body 104 to contract onto the target object 102 such that a tight-fitting outer mold is formed on the target object 102. For example, the forces applied at the manipulation structures 110, 910 away from the central longitudinal axis 114 to create space may be relieved to allow the membrane body 104 to contract. In these embodiments, the membrane body 104 contracts onto the target object 102. For example, the membrane body 104 fits tightly by matching the surface variations on the target object 102. For example, due to the tight fit, spaces where excess amounts of the substance may pool are avoided. For example, the membrane body 104 creates an outer mold with a tight fit such that a coating of the substance with relatively consistent thickness on all surfaces of the target object 102 is likely to be achieved.

In some embodiments, the method 1400 also comprises manipulating a given manipulation structure 110, 910 to adjust the outer mold on the target object 102 in the vicinity of the given manipulation structure 110, 910. As described, the manipulation structures 110, 910 provide for mechanical force to be applied to the membrane body 104 by use of a machine (e.g., actuation mechanism 504, as opposed to manually manipulating the membrane body 104 by hand, for example). For example, manipulation of the membrane body 104 may be controlled in an automated manner (e.g., using computer-controlled actuation mechanisms). In embodiments, individual manipulation structures may be used to locally manipulate the membrane body 104. In this manner, the outer mold may be locally adjusted, as desired. Advantageously, use of the mold membrane and methods described herein provide for a more efficient way to apply an outer mold onto the target object 102.

As described, the method 1400 provides a tight-fitting outer mold for the target object 102. In some embodiments, the method 1400 may comprise further processes relating to encapsulating the target object in the substance.

For example, the method 1400 may comprise introducing the substance (e.g., a resin) between the outer mold formed by the mold membrane 100 and the inner mold formed by the carrier object 108. For example, the method 1400 may further comprise applying a vacuum to seal the mold membrane 100 to the carrier object such that the target object 102 is sealed between the mold membrane 100 and the carrier object 108.

As described above, the vacuum may either be applied between the mold membrane 100 and the carrier object 108 or the mold membrane 100 and carrier object may be placed within an evacuated chamber such as an autoclave.

For example, heat may be applied to cure the substance to complete the molding process. Advantageously, as a result of the tight-fitting outer mold, the target object 102 may be encapsulated in a uniform manner and so that regions of excess substance are avoided.

For example, the manipulation structures 110, 910 may be used to extract the mold membrane 100 away from the encapsulated target object 102 at the end of the process. This occurs, for example in an automated and controlled manner, as previously described.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example of a generic series of equivalent or similar features.

The disclosure is not restricted to the details of the foregoing example(s). The disclosure extends to any novel one, or any novel combination, of the features disclosed in this specification (including any accompanying claims, abstract and drawings), or to any novel one, or any novel combination, of the steps of any method or process so disclosed.

What is claimed is:

1. A reusable mold membrane for forming an outer mold during a process to encapsulate a target object in a substance, the reusable mold membrane comprising:

a cylindrical membrane body comprising a resiliently deformable material, the cylindrical membrane body being configured to receive the target object comprising a magnet coil for magnetic resonance imaging, wherein, when the cylindrical membrane body is in an un-deformed state, an inner diameter of the cylindrical membrane body is less than an outer diameter of the target object that is provided on an outer surface of a cylindrical carrier object; and a plurality of manipulation structures provided on an outer part of the cylindrical membrane body, wherein each of the plurality of manipulation structures is configured to be manipulated via application of mechanical force to control a space within the cylindrical membrane body by controlling an amount of deformation of the cylindrical membrane body to thereby place the cylindrical membrane body in a deformed state, and wherein the reusable mold membrane is configured to receive the target object while the cylindrical membrane body is in the deformed state, and to encapsulate the target object in the substance while the cylindrical membrane body is in the un-deformed state, wherein the cylindrical membrane body comprises a flange at a first end of the reusable mold membrane, the flange extending inwards into the cylindrical membrane body.

2. The reusable mold membrane according to claim 1, wherein one or more of the plurality of manipulation structures comprises an elongated through hole configured to receive an elongated manipulation member, and wherein applying a force to an end of the elongated manipulation member in a direction perpendicular to a central longitudinal axis of the cylindrical membrane body causes a portion of the cylindrical membrane body in a vicinity of a respective one of the plurality of manipulation structures to deform.

3. The reusable mold membrane according to claim 1, wherein one or more of the plurality of manipulation structures comprises:

an embedded manipulation member that is embedded within the cylindrical membrane body, and wherein one or more attachment structures attached to the embedded manipulation member protrude from the cylindrical membrane body in a direction away from a central longitudinal axis of the cylindrical membrane body.

4. The reusable mold membrane according to claim 3, wherein each of the one or more of the plurality of manipulation structures is configured such that applying a force to the one or more attachment structures of a respective embedded manipulation member in a direction perpendicular to the central longitudinal axis causes a portion of the cylindrical membrane body in a vicinity of a respective one of the plurality of manipulation structures to deform.

5. The reusable mold membrane according to claim 1, further comprising:

a first seal arrangement disposed towards the first end of the reusable mold membrane, wherein the first seal arrangement is configured to form a seal against the cylindrical carrier object positioned within the cylindrical membrane body.

6. The reusable mold membrane according to claim 5, further comprising:

a second seal arrangement disposed towards a second end of the reusable mold membrane, wherein the second seal arrangement is configured to form a seal against the cylindrical carrier object positioned within the cylindrical membrane body.

7. The reusable mold membrane according to claim 5, wherein the first seal arrangement is disposed on the flange.

8. The reusable mold membrane according to claim 1, further comprising:

a rigid base structure connected to the flange at an innermost edge of the flange.

9. The reusable mold membrane according to claim 1, further comprising:

a first alignment arrangement configured to engage with a second alignment arrangement such that a rotational alignment of the reusable mold membrane about a central longitudinal axis relative to the cylindrical carrier object is fixed.

10. The reusable mold membrane according to claim 1, further comprising:

a reservoir structure disposed at a second end of the reusable mold membrane for introducing the substance for encapsulation.

11. The reusable mold membrane according to claim 1, wherein each of the plurality of manipulation structures comprises a manipulation structure fabric reinforcement molded therein.

12. The reusable mold membrane according to claim 1, wherein the cylindrical membrane body comprises a membrane body fabric reinforcement configured to restrict an amount of deformation of the cylindrical membrane body.

13. The reusable mold membrane according to claim 1, further comprising:

a first seal arrangement comprising a channel disposed at the first end of the cylindrical membrane body, the first seal arrangement being configured to create, under application of a vacuum, a seal against the cylindrical carrier object positioned within the cylindrical membrane body.

14. The reusable mold membrane according to claim 13, wherein the first seal arrangement is configured to cause the flange of the cylindrical membrane body to press against the cylindrical carrier under application of the vacuum to thereby form the seal.

15. A reusable mold membrane for forming an outer mold during a process to encapsulate a target object in a substance, the reusable mold membrane comprising:

a cylindrical membrane body comprising a resiliently deformable material, the cylindrical membrane body being configured to receive the target object comprising a magnet coil for magnetic resonance imaging, wherein the cylindrical membrane body comprises a flange at a first end of the reusable mold membrane;

a rigid base structure connected to the flange, wherein, when the cylindrical membrane body is in an un-deformed state, an inner diameter of the cylindrical membrane body is less than an outer diameter of the target object that is provided on an outer surface of a cylindrical carrier object; and a plurality of manipulation structures provided on an outer part of the cylindrical membrane body, wherein each of the plurality of manipulation structures is configured to be manipulated via application of mechanical force to control a space within the cylindrical membrane body by controlling an amount of deformation of the cylindrical membrane body to thereby place the cylindrical membrane body in a deformed state, and wherein, the reusable mold membrane is configured to receive the target object while the cylindrical membrane body is in the deformed state, and to encapsulate the target object in the substance while the cylindrical membrane body is in the un-deformed state.

16. The reusable mold membrane according to claim 15, further comprising:

a first seal arrangement disposed towards the first end of the reusable mold membrane, wherein the first seal arrangement is configured to form a seal against the cylindrical carrier object positioned within the cylindrical membrane body.

17. The reusable mold membrane according to claim 16, further comprising:

a second seal arrangement disposed towards a second end of the reusable mold membrane, wherein the second seal arrangement is configured to form a seal against the cylindrical carrier object positioned within the cylindrical membrane body.

* * * * *